(12) United States Patent
Wetherell

(10) Patent No.: US 6,222,623 B1
(45) Date of Patent: Apr. 24, 2001

(54) INTEGRATING LIGHT MIXER

(75) Inventor: William B. Wetherell, Stoneham, MA (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/390,125

(22) Filed: Sep. 3, 1999

(51) Int. Cl.[7] .................................................. G01J 1/04
(52) U.S. Cl. .................................. 356/236; 250/228
(58) Field of Search ............................ 356/236; 250/228

(56) References Cited

U.S. PATENT DOCUMENTS

| | | |
|---|---|---|
| 4,429,991 | 2/1984 | Williams . |
| 4,435,834 | 3/1984 | Pauli et al. . |
| 4,487,306 | 12/1984 | Nao et al. . |
| 4,559,451 | 12/1985 | Curl . |
| 4,559,452 | 12/1985 | Igaki et al. . |
| 4,570,063 | 2/1986 | De Bie et al. . |
| 4,587,434 | 5/1986 | Roes et al. . |
| 4,647,768 | 3/1987 | Ohta . |
| 4,795,913 | 1/1989 | Blessing et al. . |
| 4,881,268 | 11/1989 | Uchida et al. . |
| 4,995,727 | * 2/1991 | Kawagoe et al. ............... 356/402 |
| 5,236,072 | 8/1993 | Cargill . |
| 5,295,196 | 3/1994 | Raterman et al. . |
| 5,309,515 | 5/1994 | Troung et al. . |
| 5,367,577 | 11/1994 | Gotaas . |
| 5,396,570 | 3/1995 | Jenkins et al. . |
| 5,465,821 | 11/1995 | Akioka . |
| 5,476,169 | 12/1995 | Takarada et al. . |
| 5,589,936 | 12/1996 | Uchikawa et al. . |

FOREIGN PATENT DOCUMENTS

| | | |
|---|---|---|
| 0 070 621 A3 | 1/1983 | (EP) . |
| 0 101 115 A1 | 2/1984 | (EP) . |
| 2 029 007 | 3/1980 | (GB) . |
| 2 309 299 | 7/1997 | (GB) . |

\* cited by examiner

*Primary Examiner*—Frank G. Font
*Assistant Examiner*—Layla Lauchman
(74) *Attorney, Agent, or Firm*—Fish & Richardson P.C.

(57) ABSTRACT

A document validation subassembly is described. The subassembly includes a light mixer for generating at least one substantially homogenous light spot. The light mixer includes a light mixing chamber, at least one input port for accommodating at least one light source, at least one output, and at least one collimator connected to the output. In an implementation, the light mixing chamber is substantially spherical, but other shapes, such as cylindrical chambers, are also contemplated. Also described are solid core light mixer implementations.

40 Claims, 12 Drawing Sheets

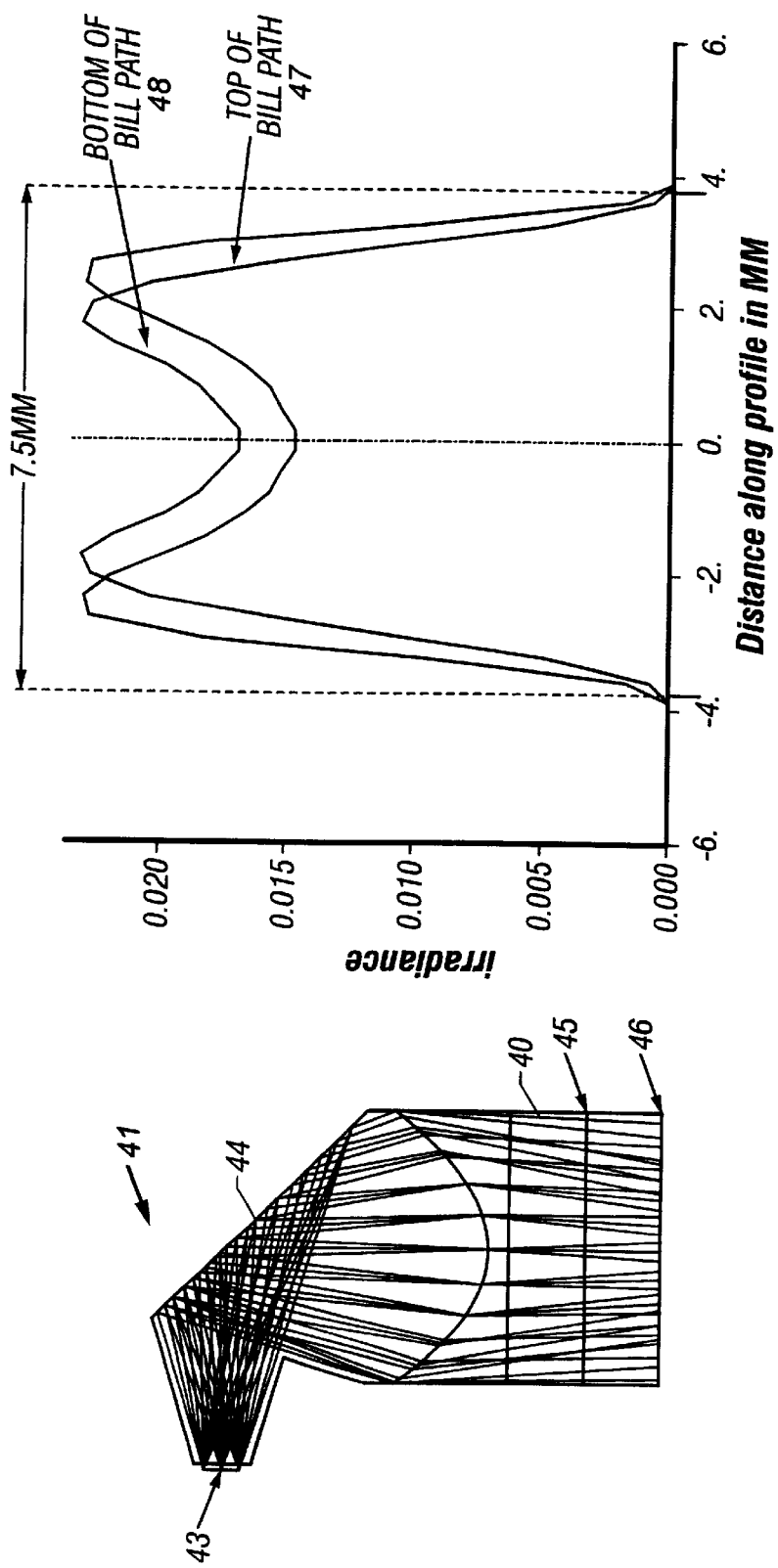

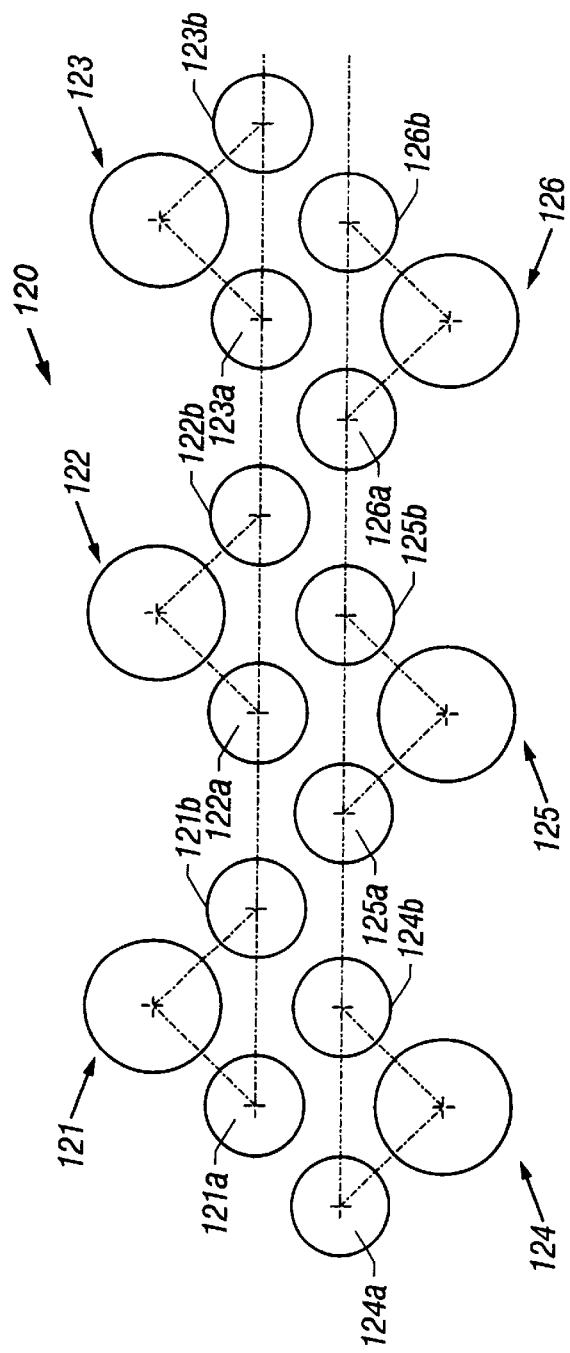
FIG. 6C
FIG. 7B
FIG. 7A

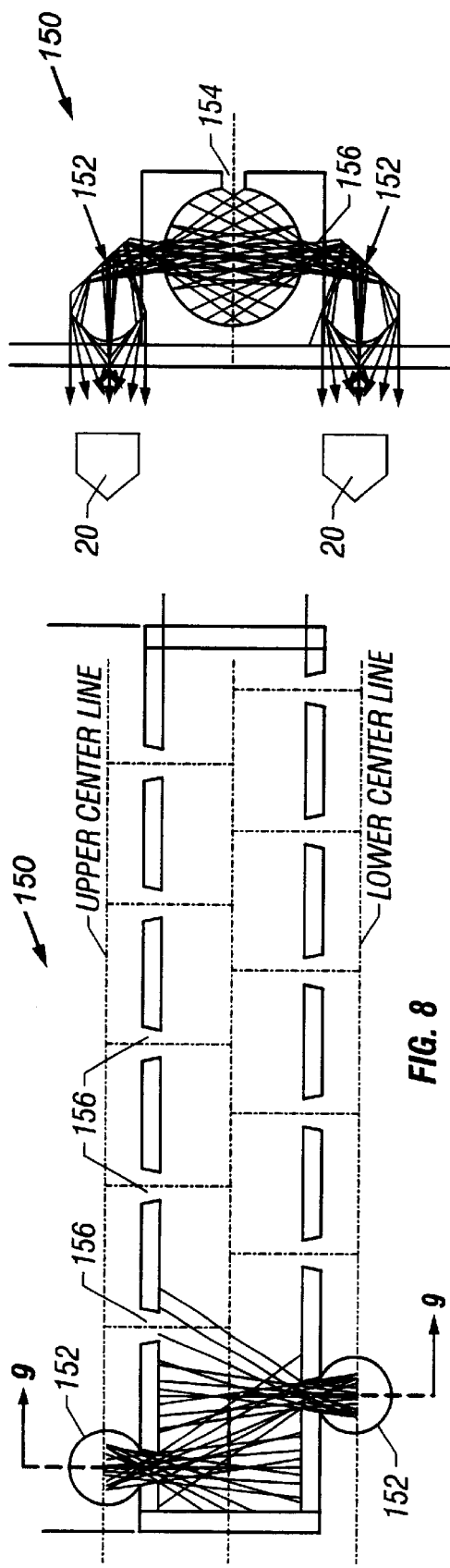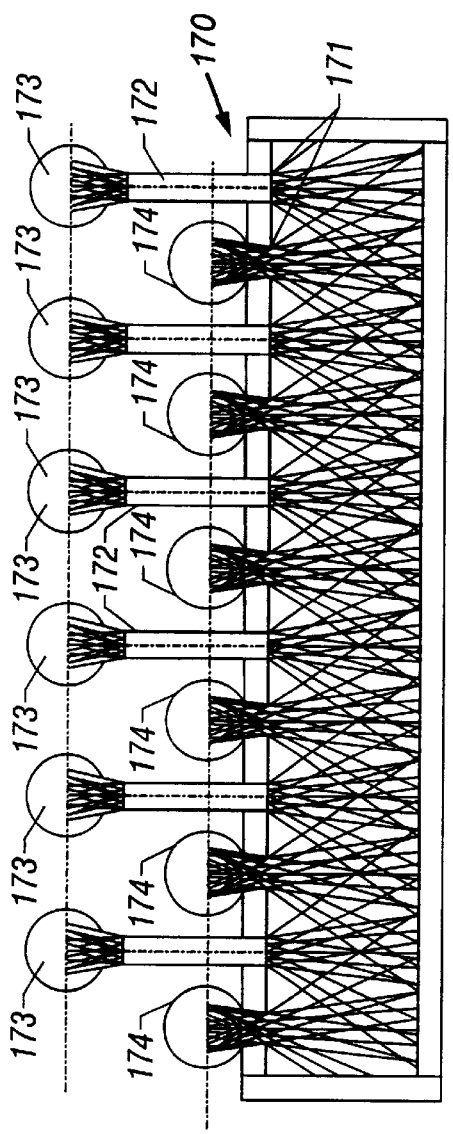
FIG. 9
FIG. 8
FIG. 10

INTEGRATING LIGHT MIXER

BACKGROUND OF THE INVENTION

The invention pertains to light mixer arrangements for providing substantially homogenous light spots. In particular, implementations of document validation subsystems utilizing a light mixer for generating substantially homogenous light spots, and methods of construction are described.

In the field of bill validation, validators used in vending machines and the like typically utilize optical, magnetic and other sensors to obtain data from an inserted bill. In some units, a plurality of light-emitting diode (LED) light sources and phototransistor receivers are positioned on opposite sides of a bill passageway, and generate a plurality of signals corresponding to the light transmitted through the bill as a bill moves past. The signals are processed to determine certain information, such as the position of the bill in the passageway and the authenticity of the bill. The signals are typically compared to predetermined measurements stored in memory that correspond to genuine bills.

Prior art systems utilizing LED light sources also used lenses to focus the light in order to meet system performance requirements. However, some configurations did not provide sufficient light signal levels to accurately validate documents. Further, designs using high power light sources and focusing elements are costly to manufacture.

SUMMARY OF THE INVENTION

A document validation subsystem having a light mixer for generating at least one substantially homogenous light spot is presented. The light mixer includes a light mixing chamber, at least one input port associated with the mixing chamber to accommodate at least one light source, at least one output associated with the mixing chamber, at least one collimator connected to the output, and at least one light receiver.

Implementations of the invention may include one or more of the following features. The light mixing chamber may include a diffuse reflective liner applied to an interior surface of the chamber. The collimator may include a mirror, and the input port may house a plurality of LED light sources. At least two light sources connected to the input port may be of different wavelengths, or may be of the same wavelength. The LED light sources may be operable to turn ON sequentially or simultaneously. A plurality of output apertures may be associated with the mixing chamber, and a plurality of collimators may be connected to the output apertures to generate substantially homogenous light spots. In addition, at least one of the collimators may include a lens, and at least one lens component may be attached to an upper platen of a document passageway.

In another implementation, a method for constructing a document validation subsystem is described. The method includes constructing a light mixer for generating at least one substantially homogenous light spot, connecting a light source to the light mixer, connecting the light mixer and source to a wall of a document passageway, and connecting a light receiver to a wall of the document passageway to receive a light signal resulting from the substantially homogenous spot.

Implementations of the method may include one or more of the following features. The light mixer may be constructed by molding a chamber having at least one input port and at least one output aperture, applying a diffuse reflective coating to an interior surface of the chamber, and connecting at least one collimator to at least one output aperture. The chamber may be cast in two hemispheres. The method may include attaching at least one mirror to the collimator for directing light, and may include attaching at least one lens to the collimator. The light mixer may be constructed by molding a light mixing chamber using an optical plastics material, wherein the chamber includes at least one input port and at least one output aperture, and connecting at least one collimator to at least one output aperture.

Another implementation of a modular light mixer assembly includes a plurality of light mixers, each having at least one input port, at least one output aperture and at least one collimator connected to an aperture. The light mixers are arranged to provide light spot output coverage across the width of a document passageway. Included are a plurality of light sources, wherein at least one light source is connected to each input port, and at least one light receiver for sensing light generated by the light spots and for generating document validation signals.

Another implementation of a light mixer assembly for use with a document validator includes a plurality of light mixers, each having at least one input port, at least one output aperture and at least one collimator connected to an aperture. The light mixers are arranged to provide light spot output coverage across the width of a document passageway. Also included are a plurality of light sources, wherein at least one light source is connected to each input port, and at least one light receiver for sensing the light spots and for generating document validation signals.

Another aspect of the invention is a document validator subassembly that includes a cylinder having a cavity and at least one input port and a slit output. A reflective and diffusive coating is applied to the cavity. Included are at least one collimator aligned with the slit output, at least one light source connected to the input port, and at least one light receiver.

In another implementation, a document validator subassembly includes a cylinder having a cavity and at least one input port and a plurality of output apertures for generating a plurality of substantially homogenous light spots. A reflective and diffusive coating is applied to the cavity. Included are a plurality of collimators attached to the output apertures, at least one light source connected to the input port, and at least one light receiver. This implementation may include at least one light pipe connected at a first end to an output aperture and at a second end to a collimator.

In another implementation of a document validator subassembly, a block of optical material having a cavity that includes an internally reflecting and diffuse surface is used. The block of material includes at least one input port and at least one output aperture. At least one collimator is attached to the output aperture for generating at least one substantially homogenous output spot, at least one light source is connected to the input port, and at least one receiver is included.

Another implementation of a document validator subassembly includes a block of optical material having a cavity that includes an internally reflecting and diffuse surface, at least one input port and at least one output aperture. The subassembly includes at least one collimator attached to the output aperture for generating at least one substantially homogenous output spot, at least one light source connected to the input port, and at least one receiver.

Another aspect is a method for constructing a document validator subassembly. The method includes connecting a light mixer to a wall of a document passageway, the light mixer capable of generating at least one substantially homogenous light spot. The light mixer is formed by cutting a cavity into a block of optical material, wherein the cavity has reflective and diffuse characteristics, forming at least one input port and at least one output aperture that connect to the cavity, connecting at least one light source to each input port, and connecting at least one collimator to an output aperture. The method also includes connecting at least one light receiver to a wall of the document passageway to receive light resulting from the substantially homogenous light spot.

In yet another implementation, a document validator subassembly includes a light mixer for generating at least one substantially homogenous light spot. The light mixer includes a solid core light mixing chamber having an outside coating with diffuse and reflective characteristics. The coating includes at least one input area for accommodating at least one light source, and the coating includes at least one output area. At least one light directing means is connected to the output area, and a light receiver is included.

This implementation may include one or more of the following features. The light directing means may include an output area for directing light, and includes a reflective surface for feeding light energy back into the mixing chamber. The light directing means may be substantially hemispherically shaped. At least one light source means may be connected to the input area. A flat mirror for redirecting light from the light direction means may be included. The light mixer may include a collimating lens connected to a platen of a document passageway. The light mixing chamber may be spherical or cylindrical. A linear array light source may be connected to the mixing chamber.

A method for constructing a solid core light mixer for generating at least one substantially homogenous light spot is also described. The method includes forming a light mixing chamber of optical material, coating the chamber with a material having reflective and diffuse characteristics, forming at least one input area and at least one output area, connecting the solid core light mixer to a wall of a document passageway, and connecting a light receiver to a wall of the document passageway.

The method may include one or more of the following features. The method may include applying an external protective layer to the coating material, and may include connecting at least one light source to each input area. The light directing means may direct light inside a collecting angle to a document passageway, and reflect light outside the collecting angle back into the mixing chamber. The light mixing chamber may be formed in a spherical shape, or the light mixing chamber may be formed in a cylindrical shape.

Advantages of the described configurations include the capability of providing several spots of different wavelengths with a minimum number of LED's. For example, in several of the described configurations, a plurality of output spots of multiple different wavelengths can be output for use by a bill validator using a reduced number of LED's, which is substantially less than the number of dies required by prior art devices having one set per spot. Thus, costs are minimized by sharing sets of LEDs, each set illuminating two or more spots on a bill.

In the case of solid core integrators, there is no requirement to coat an interior surface. Thus, solid core integrators may be less expensive to manufacture, and may be more compact. Further, since solid core integrators have more mass, and may include a protective outside coating, such integrators may be more durable than hollow core light mixers.

The configurations described meet performance requirements for use with a document validator and are compact. In addition, some existing document validators need not be modified to accept the configurations. There is also a cost benefit, because less LED dies are required to generate several spots at multiple different wavelengths.

Other features and advantages of the invention will be apparent from the detailed description, from the accompanying drawings and from the claims.

BRIEF DESCRIPTION OF THE DRAWINGS

FIG. 5C is a cutaway side view of an implementation of a collimator.

FIG. 5D is a graph illustrating the output beam profile of the collimator of FIG. 5C.

FIG. 6C is a simplified top view of yet another implementation of a light source system according to the invention.

FIG. 7A is a cutaway perspective view of a cylindrical integrating light mixer according to the invention.

FIG. 7B is a cutaway side view of the cylindrical integrating light mixer of FIG. 7A.

FIG. 8 is a simplified, cutaway top view of another implementation of a cylindrical light mixer according to the invention.

FIG. 9 is a cross-sectional side view of the cylindrical light taken along dotted line 9—9.

FIG. 10 is a simplified cutaway top view of yet another implementation of a cylindrical light mixer including light pipes according to the invention.

DETAILED DESCRIPTION

Figure 1:
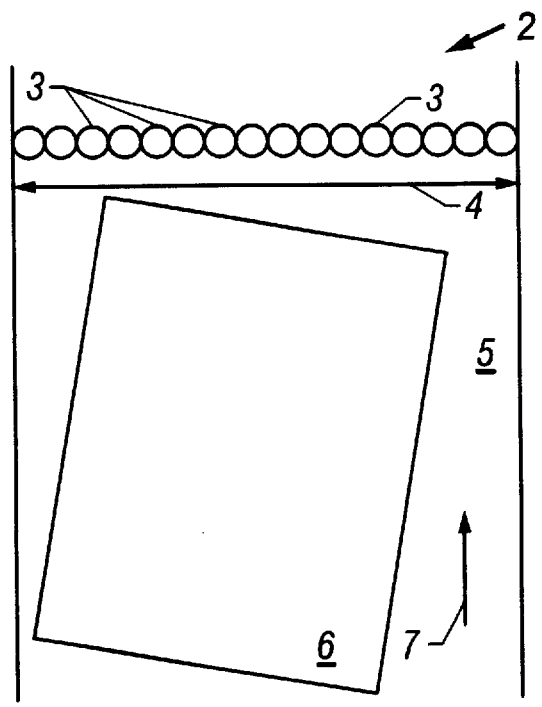
FIG. 1 is a simplified top view of a document passageway and light spot configuration.

FIG. 1 is a simplified top view of a document passageway 5 having a light spot configuration 2 of a plurality of light spots 3 arranged in a single line to cover the width 4 of a document passageway 5. The width 4 is wider than the widest document of a set of documents to be sampled, and a banknote or bill 6 is shown that is narrower than the document passageway. In this example, the document 6 is skewed slightly as it travels in the direction of arrow 7.

It should be noted that the term"document" means any substantially flat item of value including, but not limited to, banknotes, bank drafts, bills, cheques, tokens, coins, paper currency, security documents and any other similar objects of value. Similarly, although the light mixers are described herein with regard to their use in document validators, the light mixers could be used in other devices where a substantially homogenous light spot is required.

It has been found that circular spots having a diameter size in the range of 5 millimeters (mm) to 9 mm are suitable for validating bills, but other diameter sizes may also be used. It is to be understood, however, that the term"spot" as used herein is not intended to limit the shape of the light used, since systems could be designed to utilize light spots having circular, rectangular, polygonal or some other shape.

Referring again to FIG. 1, the spots 3 may be generated by one or more light sources, typically by one or more light emitting diodes (LEDs). Such a configuration permits substantially 100% scanning coverage of an inserted bill 6 as it moves in the direction of arrow 7 through the bill passageway. In particular, the bill may be transported between the light source or sources and one or more light receiving sensors (not shown) arranged on the opposite side of the bill passageway. In such a configuration, signals generated by the receivers correspond to the light transmitted through the bill and can be processed to determine information such as bill length and width, bill position at any particular moment in time, bill authenticity, and country of origin of the bill. Light receivers could also be arranged on the same side as the light sources to receive light reflected from the bill.

A contemplated implementation uses twelve light spots across the bill passageway for sampling data from a bill, but more or less spots could be used. Each spot may be approximately 7.5 mm in diameter with each spot being sampled at three or more wavelengths. For example, light spots having wavelengths in the visible, infrared and near infrared spectrum could be used and the resultant data processed to glean different types of information from a bill. Signal processing techniques to determine bill authenticity, nationality, denomination and/or bill position in the passageway are beyond the scope of the present application and will not be discussed in detail herein.

Figure 2:
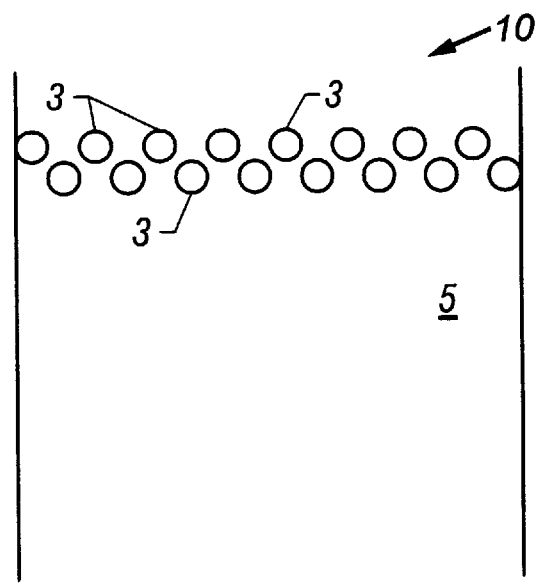
FIG. 2 is a simplified top view of a zig-zag light spot configuration.

FIG. 2 is a simplified top view of a zig-zag light spot configuration 10 that covers the width of the bill passageway 5. In some cases, such as when individual LED light sources are used, such a zig-zag pattern is desirable because the placement of the light sources is less critical due to more relaxed mechanical tolerances. Further, constraints on the diameter of any required lens for each LED source are mitigated, and the potential for cross-talk interference between adjacent light spot signals is minimized.

Referring to FIG. 2, signals generated by light receivers in response to the zig-zag pattern of light spots can be processed to construct a data array in memory as the bill moves past the sensors. The data array can then be adjusted so that the data is equivalent to that generated by a single line of sensors, to facilitate further data processing. Such data adjustment is simplified if the sensors are offset by a multiple of the spot diameter, such as the one spot diameter spacing shown in FIG. 2. But other multiples such as two spot diameters could be used.

Figure 3:
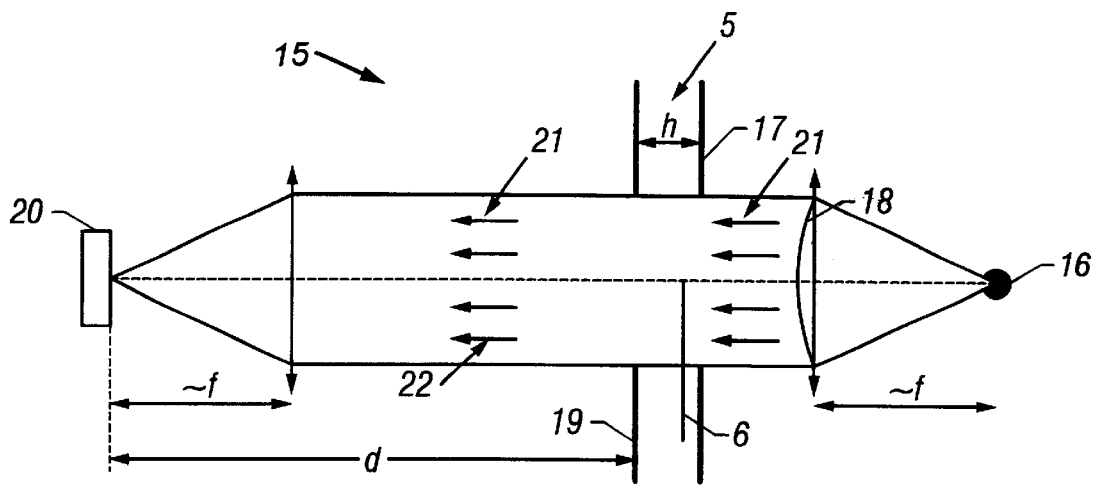
FIG. 3 is a side view of a light source and receiver implementation.

FIG. 3 is a side view of a conventional configuration 15 of a single LED light source and receiver wherein the light source 16 and receiver 20 are on opposite sides of the bill passageway 5. The LED source 16 is placed close to the focal point of a convergent lens 18 to generate substantially parallel beams of light 21 through an opening in the front wall 17 of the bill passageway 5 towards the bill 6. Part of the bill blocks some of the light beams 21 resulting in transmitted light signals 22 which have passed through the bill. A detector 20, such as a PIN diode which may include a focusing lens, is placed a sufficient distance "d" from the rear wall 19 so that noise inherent in the light transmitted through the bill is minimized. The height "h" of the bill passageway may be 2 mm to 2.5 mm which is adequate to minimize the jam rate of bills, and the width 4 of the bill passageway (shown in FIG. 1) may be greater than 90 mm to accommodate bills of various widths.

In order to simplify the data processing required to authenticate a bill, a circular spot shape and substantially homogenous illumination are desirable. In practice, due to the size and light transmission features of existing LED light sources, generation of a parallel beam and a homogenous spot can only be approximated with a configuration of the type shown in FIG. 3. A group of such sensors positioned in one of the configurations shown in FIGS. 1 or 2 may be sufficient to determine document position, but the signals generated are not entirely satisfactory for generating data to determine authenticity. When several LED dies are used, the minimum spacing of the dies may result in spot offsets, and thus tight tolerances must be imposed on die placement. The light mixer configurations described below do not require tight tolerances on die placement, and implementations are capable generating several spots with the same group of LED light sources.

Figure 4:
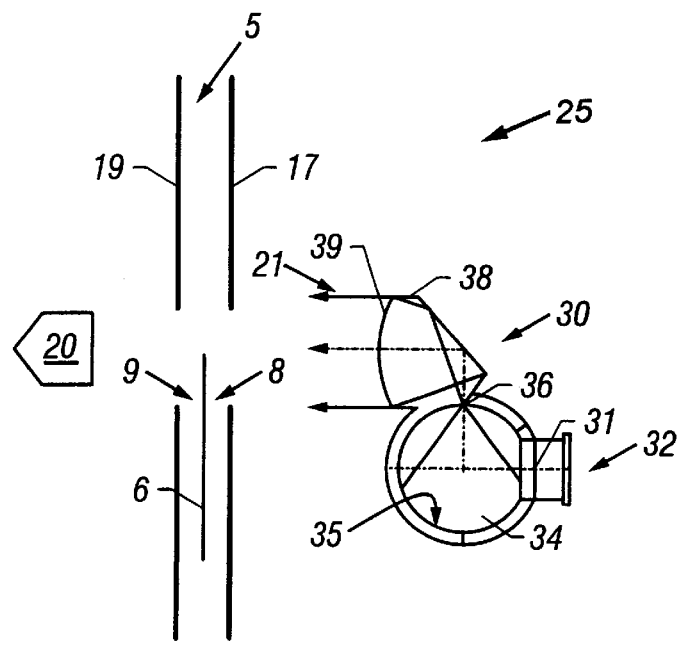
FIG. 4 is a cutaway side view of an implementation of an integrating light mixer according to the invention.

FIG. 4 is a cutaway side view of an implementation of a document validation subsystem 25 for use with a document validator. The subsystem includes at least one integrating light source in the form of a substantially spherical light mixer 30 for generating a light spot, and a light detector 20. A plurality of subsystems 25 can be used in a sensor arrangement of a document validator. In the implementation of FIG. 4, the integrating light source 30 is on the opposite side of a bill passageway 5 from a light receiver 20, but other arrangements, such as one having the receiver 20 on the same side of the passageway, are contemplated. Furthermore, the integrating light source may not be spherical but may have other shapes, such as square. However, some shapes may be less than ideal for forming integrating light sources, and thus such light sources having odd shapes may be prone to energy losses.

Referring again to FIG. 4, the integrating light source 30 includes a light mixing chamber 34 having a substantially spherically shaped hollow interior cavity containing a highly diffusive and reflective coating 35 (a suitable coating is Spectralon™ manufactured by the Labsphere Company). An input port 31 associated with the mixing chamber 34 accommodates at least one light source 32, but multiple LED light sources may be accommodated. Light beams from the source reflect off of the interior diffusive and reflective material. A small exit aperture 36 permits light to exit the mixing chamber 34 and enter a collimator 38 that may include a lens 39. The light beams 21 exit the integrating light source 30 and form a substantially homogenous light spot.

The substantially homogenous light spot passes through an opening 8 in the front wall 17 of the bill passageway 5, through an opening 9 in rear wall 19 and impinges on a receiver 20. As a bill 6 is transported in the passageway, it will block some of the light of the light spot so that the intensity of the light reaching the receiver 20 will vary and the output signals of the receiver will also vary. The receiver 20 may be a pin diode, a phototransistor, or other light sensor capable of generating a document detection and/or validation signals for processing.

The interior coating 35 of the mixing chamber 34 of the integrating light mixer 30 is substantially Lambertian, meaning that it is a material that will radiate light according to Lambert's Law, which light will appear equally bright when viewed by an observer from any direction. The interior coating causes the light from one or more LED light sources to be diffused and reflected in a random fashion about the interior of the light mixer 30 before exiting. Consequently, any elemental area on the inside of the sphere will evenly illuminate all other areas on the sphere and the output aperture 36 will look like a Lambertian source.

The integrating sphere analyzed in the example shown in FIG. 4 has a rise time of about 1 nanosecond, which is the duration between when the light source is energized and the point at which the output light is at a steady state. Such a fast rise time is suitable for use of the integrating sphere in a system for validating bills.

The input port 31 may be configured to house a plurality of LED light sources. In particular, it is contemplated that three or more LED light sources may be used, each of a different wavelength, so that different wavelength combinations of light can be generated for use in producing signals to validate bills. Due to the "immersion effect" that light undergoes within the mixing chamber 34, the position of each LED die is not critical to system alignment. Consequently, a collimated beam can be produced within the bill passageway with substantially the same properties for each wavelength. Two or more output collimators may be connected to the mixing chamber, wherein at least one exit aperture would be associated with each collimator, to generate two or more collimated light spot beams. Use of a plurality of such light integrators reduces the total number of LED sources needed for a light source system. However, if a strong light spot output is required, it may be advisable to minimize the number of output ports.

The integrating sphere 30 may be cast in two hemispheres of molded plastic having an input aperture for inserting an LED package to serve as the light source. The output collimator may be molded as a separate collimating lens package. This approach requires a thin material that can be applied to coat the inside of each hemisphere so that when assembled the interior of the sphere approximates a Lambertian reflector of high efficiency. Such a coating cannot have a smooth air/paint surface, since this would have a specular reflection component which would cause significant departure from Lambertian reflectivity at large angles of incidence. Suitable coatings have a very porous structure, and must be fairly thick to produce high total reflectivity. Sprayable coatings having such properties are available from Optronics Laboratories, Inc., of Orlando, Fla. Alternatively, W.L. Gore & Associates of Newark, Del. manufactures a thin sheet material having diffuse reflectivity properties that depend upon the thickness of the sheet. Such material could be applied in a thin sheet to the interior surfaces of each hemisphere before attaching together to form an integrating sphere. However, laying such a coating down on the inside of a small diameter hollow sphere may be difficult and costly, and in the case of small diameter spheres, the resultant sphere has an external diameter that is substantially larger than its inside diameter.

In an alternate fabrication method, the integrating sphere 30 may be molded in one piece of plastic or other suitable material. If such a technique is used, then a reflecting and diffuse coating must be applied through either the input aperture or the exit aperture so that the interior of the sphere approximates a Lambertian reflector.

Figure 5A:
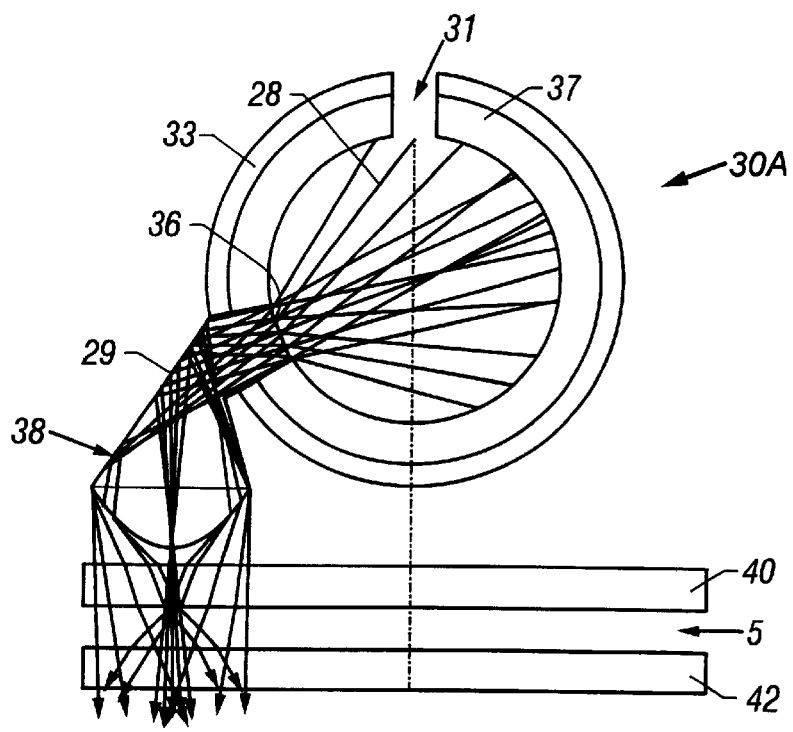
FIG. 5A is a cutaway side view of another implementation of a light mixer according to the invention.

FIG. 5A is a cutaway side view of an implementation of a light mixer 30A to illustrate structural details. In particular, the light mixer may be constructed by molding and assembling a structural shell 33 of plastics, metal or other convenient material such that it contains a spherical interior having at least one input port 31 and at least one output aperture 36. As explained above, a diffuse reflecting liner 37 may be added or applied to the interior of the shell to form the light mixing chamber. Alternatively, the optical plastic of the shell 33 may have diffuse and reflecting properties so that a lining material having such characteristics is not required for application to the interior of the shell.

Referring again to FIG. 5A, light rays 28 from a source eventually impinge upon an output aperture area 36 of the integrating sphere and enter a separate, clear plastic output module or collimator 38. The optical axis of the collimator is tilted to ensure total internal reflection at a mirror 29 on the interior surface of the collimator. The mirror may be substantially flat or of another shape. The collimator directs the light towards an opening in the upper platen 40 of the bill passageway. A detector (not shown) is positioned beneath an opening in the lower platen 42 opposite the collimator 38 to receive light transmitted through a bill in the bill passageway 5.

Figure 5B:
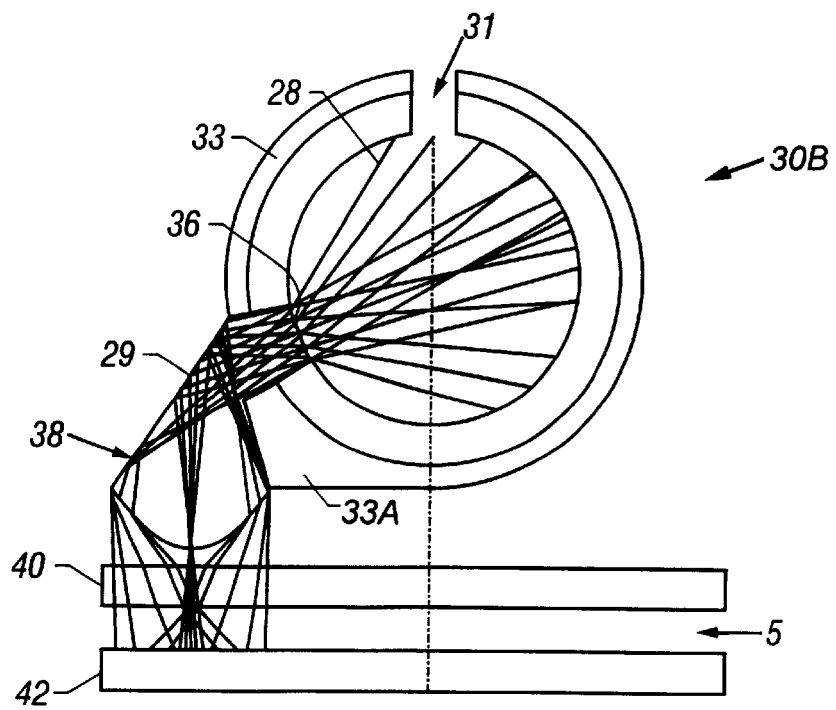
FIG. 5B is a cutaway side view of yet another implementation of a light mixer according to the invention.

FIG. 5B is a cutaway side view of another implementation of a light mixer 30B to illustrate structural details. The light mixer 30B may be constructed by molding an optical plastics material into a structural shell 33 such that it contains a spherical interior having at least one input port 31 and at least one output aperture 36. In this implementation, the collimator 38 is an integral part of the light mixer, and includes a wall formed by a shoulder 33A of the light mixer shell. Thus, in this implementation the collimator 38 is an integral part of one of the hemispheres of the shell 33.

FIG. 5C is an implementation of a collimator 41 for directing light from an integrating sphere impinging on area 43 towards the bill passageway. The collimator 41 includes a reflecting surface 44, and may be molded out of an optical plastic material as a separate component. Alternately, the collimator may be part of the integrating sphere. It may be possible to avoid having to include a reflecting surface 44 if the material used to manufacture the collimator permits reflection by total internal reflection (TIR) over its entire surface. As described above with regard to FIGS. 5A and 5B, the light spot created by the collimator 41 passes through an opening in the upper platen 40 to provide a substantially collimated spot from the top 45 to the bottom 46 of the bill passageway.

FIG. 5D is a graph illustrating the output beam profile 47 of the collimator 41 of FIG. 5C at the top of the bill passageway 45 and the beam profile 48 at the bottom of the bill passageway 46. The beam profiles depict irradiance the vertical axis versus distance along the profile on the horizontal axis in millimeters, for a 7.5 mm spot, wherein the profiles have been overlaid to show how the light distribution and beam diameter change. Ideally, the integrating sphere will produce a perfectly collimated beam with the bill path having a diameter constant within 2 percent and having a "top hat" profile which is flat across the beam and constant to within 2 percent for all wavelengths. The top hat beam profile is desirable because it is characteristic of a substantially homogenous light spot having a fairly even distribution of light power. The integrating design of the light mixer 30A and 30B illustrated above provides a substantially homogenized beam output for all wavelengths.

Figure 5F:
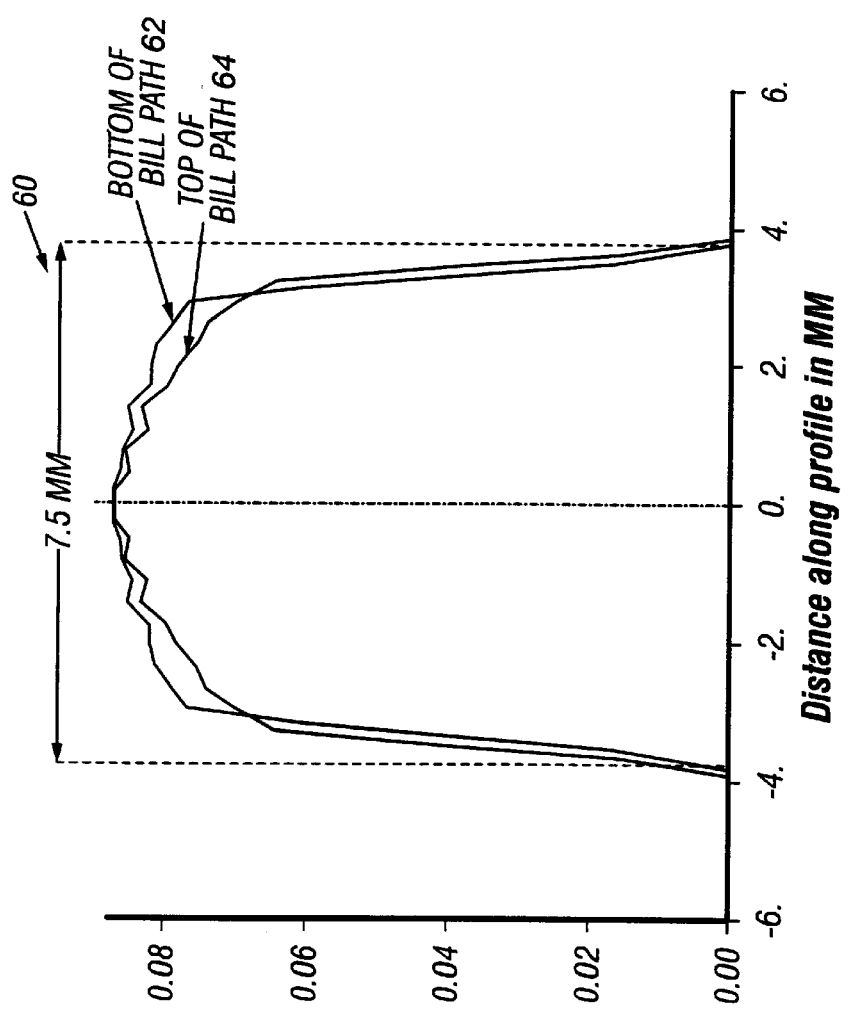
FIG. 5F is a graph illustrating the output beam profile of the collimator of FIG. 5E.
Figure 5E:
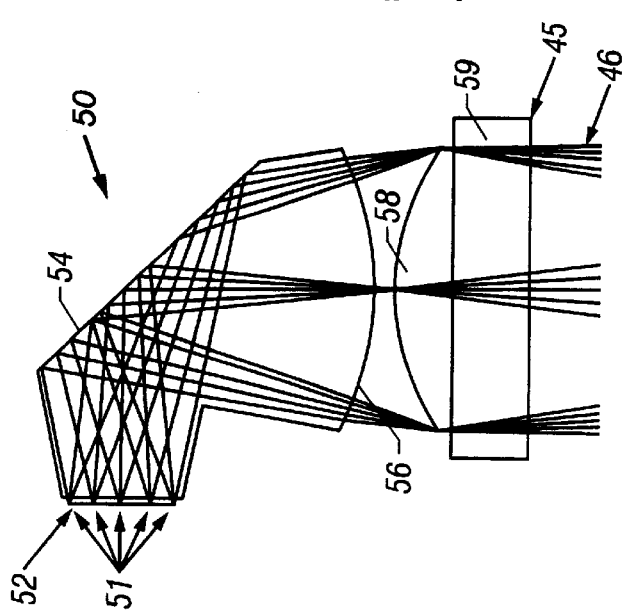
FIG. 5E is a cutaway side view of another implementation of a collimator.

FIG. 5E is a cutaway side view of another implementation of a collimator 50 having a two component lens structure, and FIG. 5F is a graph 60 illustrating the output beam profile at the top wall 45 and bottom wall 46 of the bill passageway. Light beams 51 from the mixing chamber enter the collimator through a plurality of apertures in area 52, strike a reflecting surface 54 and pass through a lens 56. The light beams then pass through a second lens 58 which may be integrated with the upper platen 59 or may be a separate lens that is otherwise attached to the upper platen 59 in the upper wall of the bill passageway. Further, although two lenses are shown, three or more lenses may be used to achieve a desired spot.

Graph 60 of FIG. 5F illustrates the output beam profile 62 at the bottom of the bill path 46 and the beam profile 64 at the top of the bill path 45 of the dual lens collimator structure 50. As shown, both of the profiles are fairly uniform, meaning that the spot power and shape are nearly the same at the top and bottom of the bill passageway, which are characteristic of a substantially homogenous light spot. The two-powered surfaces of the configuration of FIG. 5E improves the power distribution across the beam.

Figures 5G, 5H:
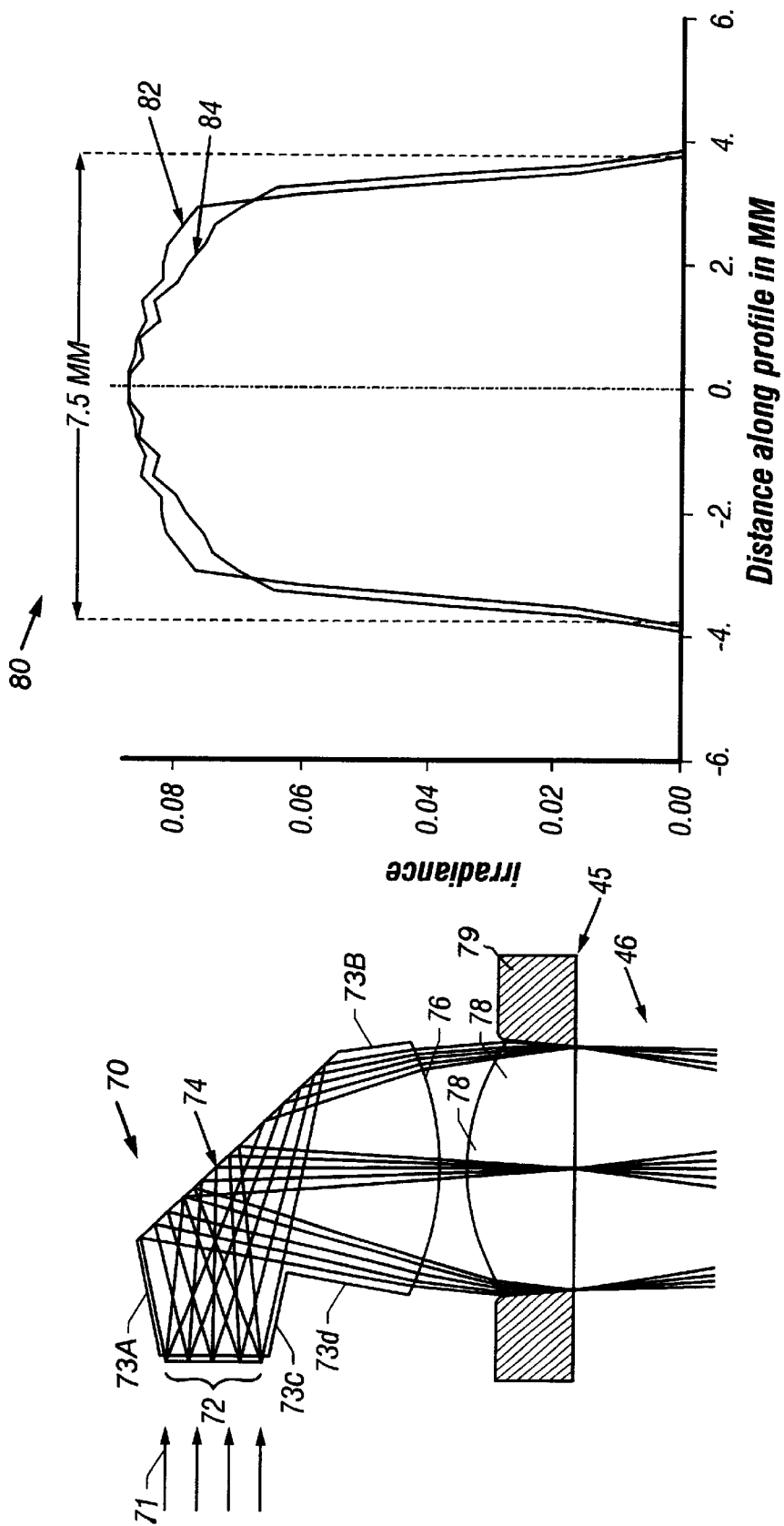
FIG. 5G is a cutaway side view of yet another implementation of a collimator.
FIG. 5H is a graph illustrating the output beam profile of the collimator of FIG. 5G.

FIG. 5G is a cutaway side view of yet another implementation of a dual lens collimator structure 70, and FIG. 5H is a graph illustrating the output beam profile at the top 45 and bottom 46 walls of the bill passageway. Referring to FIG. 5G, light beams 71 from the integrating mixing chamber (not shown) enter the collimator through a plurality of apertures in area 72. This configuration includes components to control the amount of stray light that may be emitted. In particular, a light absorbing coating on sections 73A, 73B, 73C and 73D of the collimator absorbs light, in contrast to the reflective coating on surface 74. Thus, light enters the collimator, reflects off section 74 and passes through a lens 76. The light beams then pass through a second lens 78 positioned in the upper platen 79. The upper platen 79 includes light absorbing material. A possible implementation involves using an opaque coating with holes in it on the bottom surface of the platen and molding the lens 78 into the upper surface of the platen 79. But the opaque surface would be subject to wear and may even be removed by normal usage of the bill validator. Thus, embedding a separate lens element 78 into a tapered opening in the platen 79 may be preferable. The platen 79 in this case could then be made of opaque black plastic to absorb any stray light.

FIG. 5H is a graph 80 of the output beam profile 82 at the bottom of the bill path 46 and the beam profile 84 at the top of the bill path 45 of the dual lens collimator structure 70. As shown, the profiles are fairly uniform which indicates a fairly uniform power distribution across the beam.

Figure 6A:
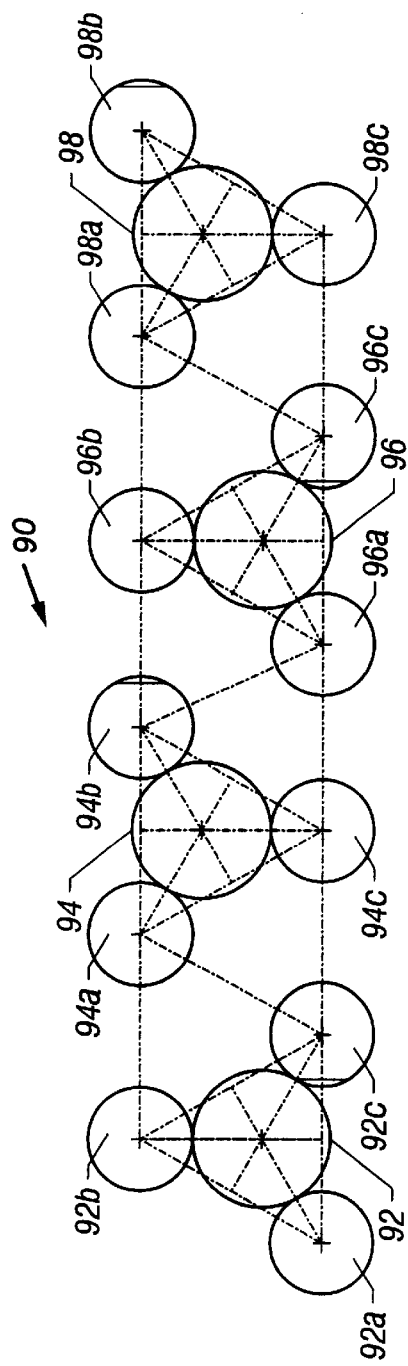
FIG. 6A is a simplified top view of a light source system according to the invention.

FIG. 6A is a top view of a light source system 90 including a plurality of spherical light mixers 92, 94, 96 and 98 arranged to provide twelve output spots. In this implementation, each of the light mixers has three collimators 92A–C, 94A–C, 96A–C and 98A–C such that each light mixer generates three spots over an area that covers the width of a document passageway.

In the three-collimator design of FIG. 6A, each integrating sphere has output ports located around the equator of the sphere at 120° intervals, each positioned at the apex of an equilateral triangle. In an implementation, each side of the triangle is 15 mm long, and each collimator contains a fold mirror that directs light toward the south pole of the sphere towards the document passageway. The three collimated beam outputs from each sphere are parallel to each other, and perpendicular to the document passageway. Light from the LED sources enters the north pole of the sphere at right angles to the output ports and parallel to the output beams. The described configuration provides a system of integrating spheres that uses only four LED sets whose supporting circuitry could be mounted on a common circuit board. Consequently, the system of FIG. 6A has favorable cost and packaging characteristics.

It should be understood, however, that each light mixer 92, 94 and 96 may include a plurality of LED light sources. The light sources may be of several different wavelengths, or of the same wavelength in order to increase the output power at that wavelength. During use in a document validator, the LED light sources of the system 90 could be turned ON sequentially, or could be turned ON simultaneously. Operation of the light sources in each light mixer, and in the overall system of FIG. 6A, may be under the control of a microprocessor or other control circuitry of the document validator.

Figure 6B:
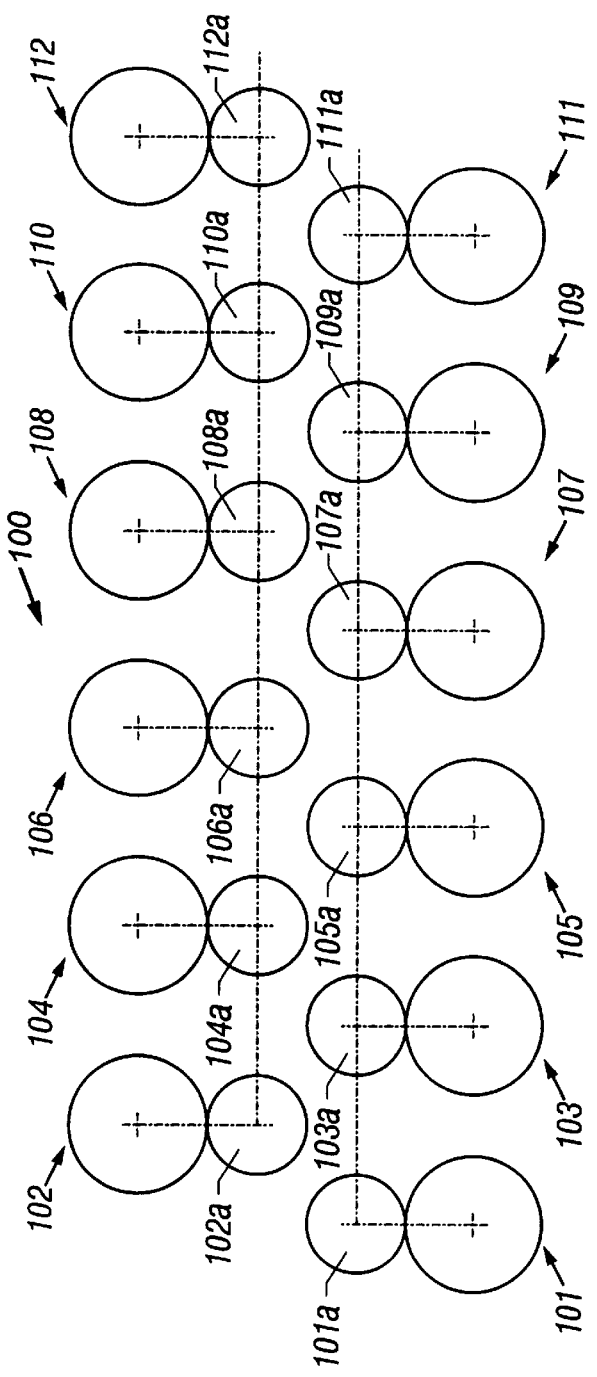
FIG. 6B is a simplified top view of another implementation of a light source system according to the invention.

FIG. 6B is a simplified top view of an implementation of a light source system 100 having twelve integrating spheres to form twelve spots. Each of the integrating spheres 101 to 112 has one output, shown as collimators 101a to 112a, respectively. Using one integrating sphere per spot does not reduce the number of LEDs required over direct illumination schemes, but does serve to uniformly mix light from all LEDs feeding light into the sphere. With this arrangement, the spacing between the two offset rows of spots is not restricted as is the case in the implementation of FIG. 6A. Any spacing can be selected, from zero (twelve spots in one line) up to the spacing shown in FIG. 6A, in which adjacent spots are at the corners of equilateral triangles.

Each light mixer 101 to 112 may include a plurality of LED light sources of several different wavelengths, or of the same wavelength if it is desired to increase the light output power at that wavelength. During use in a document validator, each LED light source of the system 100 may be turned ON sequentially or simultaneously. Operation of the light sources in each light mixer, and in the overall system 100 of FIG. 6B, may be under the control of a microprocessor or other control circuitry of the document validator.

FIG. 6C is a simplified top view of another implementation of a light source system 120 having six integrating spheres to form twelve spots. Each of the integrating spheres 121 to 126 has two outputs, shown as collimators 121a, 121b through 126a, 126b. Using two outputs per integrating sphere can reduce the total number of LEDs required over direct illumination schemes such as shown in FIGS. 3 and 6B by as much as a factor of two, while still uniformly mixing the outputs of all LEDs in each spot. It is possible to add extra LEDs at wavelengths where LED output is low. The spacing between the two offset rows of spots can be set to any value between zero (the twelve spots in one line) up to a separation which places adjacent LEDs at the corners of equilateral triangles.

Each light mixer 121 to 126 may include a plurality of LED light sources of several different wavelengths, or of the same wavelength if it is desired to increase the light output power at that wavelength. During use in a document validator, each LED light source of the system 120 may be turned ON sequentially or simultaneously. Operation of the light sources in each light mixer, and in the overall system 120 of FIG. 6C, may be under the control of a microprocessor or other control circuitry of the document validator.

The light mixer systems of FIGS. 6A to 6C can be manufactured as separate modules, or connected together into one assembly to form a source system having multiple spots to form a zig-zag or other configuration of spots. The structures shown in FIGS. 6A and 6B are illustrative of possible configurations of light mixers, each having one or more collimators and a spherically shaped interior having at least one input port. The output collimators of these examples are positioned to produce the zig-zag pattern of light spots across a document passageway. The structure utilizes a plurality of light sources, which may be LEDs, wherein each integrating sphere has at least one light source connected thereto. Two or more light sources of different wavelengths may be associated with each integrating sphere, and may be connected in such a way as to be selectable by a microprocessor to enable performance of different types of tests.

The light source system may be manufactured to retrofit to existing bill validator designs, or may be custom made. In addition, more or less spots could be used to provide partial coverage across the bill passageway or full coverage across a bill passageway.

FIG. 7A is a cutaway perspective view, and FIG. 7B a cross-sectional side view, of a cylindrical integrating light mixer 130. The cylindrical mixer includes at least one input aperture 132 and a slit output 134. A cylindrical light mixing chamber 136 has a diffusing and reflective interior, and light is directed through a collimator 138 to provide a slit output of light that is approximately 90 mm long. A light bundle source (not shown) may be connected to the input port 132.

The integrating cylinder structure 130 is less expensive to manufacture than a series of integrating spheres. In addition, the number of sets of LED dies required to provide illumination is independent of the number of spots of light being illuminated. The number of LED dies required at each wavelength corresponds to the number required to produce illumination along the output slit of adequate uniformity and high enough irradiance. It is thus possible to limit the number of dies required for a given output of light at a particular wavelength. However, in the case of a slit output the output light is collimated in only one axis, which may not be appropriate for some bill authentication processes.

FIG. 8 is a simplified, cutaway top view of another implementation of a cylindrical light mixer 150 having at least one collimator 152 connected thereto. In this embodiment, multiple collimators are connected along the length of the cylinder to produce a spot pattern. The example shown in FIG. 8A has twelve output apertures 156 alternate on opposite sides of the cylinder which configuration keeps the output beams well separated in the bill path. But as a consequence, the output ports on one side of the cylinder may fall within regions used to draw light by ports on the opposite side, which may detrimentally affect the light distribution and total output light.

FIG. 9 is a cross-sectional side view of the cylindrical light mixer 150 taken along dotted line 9—9 of FIG. 8, showing one possible configuration. The cylinder 150 includes at least one input port 154, which may be a slit running the length of the collimator, and at least one output aperture 156 for each collimator. A reflective and diffusing coating lines the interior of the cylinder to produce multiple reflections of light from the light source or sources. A light bundle of optical light source fibers may be connected to the input port 154. The substantially homogenous light spots emanating from the collimators 152 may impinge upon receivers 20 located on the opposite side of a document passageway of a document validator.

FIG. 10 is a simplified, cutaway illustration of an alternate implementation of a light mixer cylinder 170, which is similar to that of FIG. 8, however all of the output aperture areas 171 are located on one side of the cylinder. Light pipes 172 are connected to alternate output aperture areas and to collimators 173 to transport light from the cylindrical mixer 170 to the collimators. Collimators 174 are connected directly to the cylindrical mixer 170. The positions of the collimators 173 and 174 form a particular spot pattern, in FIG. 10 a zig-zag pattern, for use in authenticating bills. The use of light pipes permits all of the output ports to be positioned on the same side of the cylinder, which eliminates the problem of detrimental interference of light in the mixing chamber may occur when the output ports are on opposite sides of the cylinder.

The cylindrical light mixers depicted in FIGS. 8 to 10 may be constructed by molding a structural shell of any convenient material such as plastic or metal, to have a cylindrical interior and at least one input port and at least one output aperture. A diffuse reflecting liner may be attached to the interior of the shell to form a light mixing chamber. At least one light source is then connected to each input port, and at least one collimator or output module is connected to the output aperture.

Figure 11:
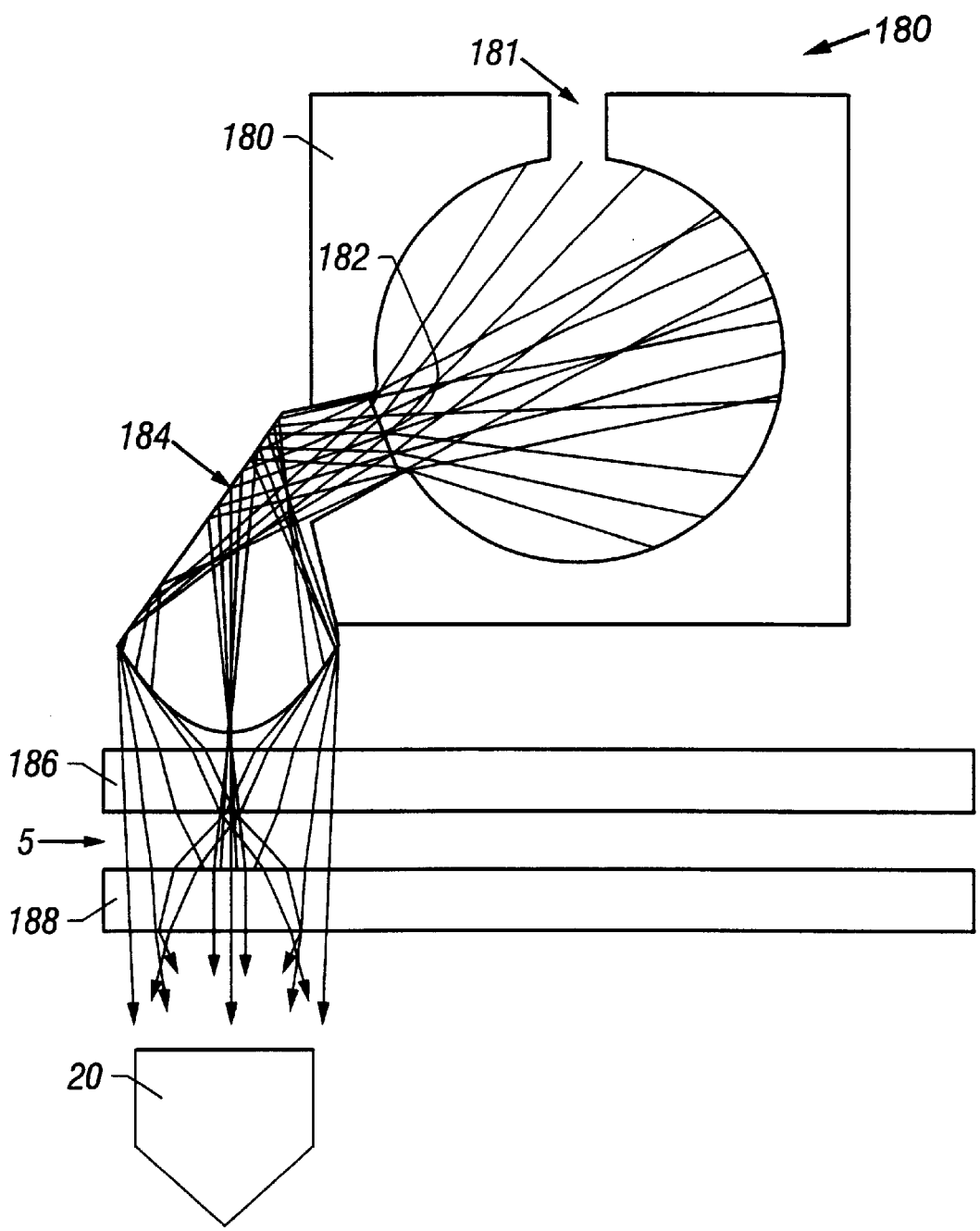
FIG. 11 is a cutaway side view of an implementation of a cylindrical light mixer according to the invention made from a block of optical material.

FIG. 11 is a cutaway side view of a light mixer 180 machined from a solid block of optical plastics material such as Spectralon™. Such a light mixer has an internally reflecting cavity that may be spherical or cylindrical. At least one input port 181 and at least one output aperture area 182 are formed in the block, and at least one collimator 184 is attached to the output aperture area. A light bundle or other light source may be connected to the input port 181. Also depicted are an upper platen 186, bill passageway 5, lower platen 188, and a light receiver 20.

Figure 12:
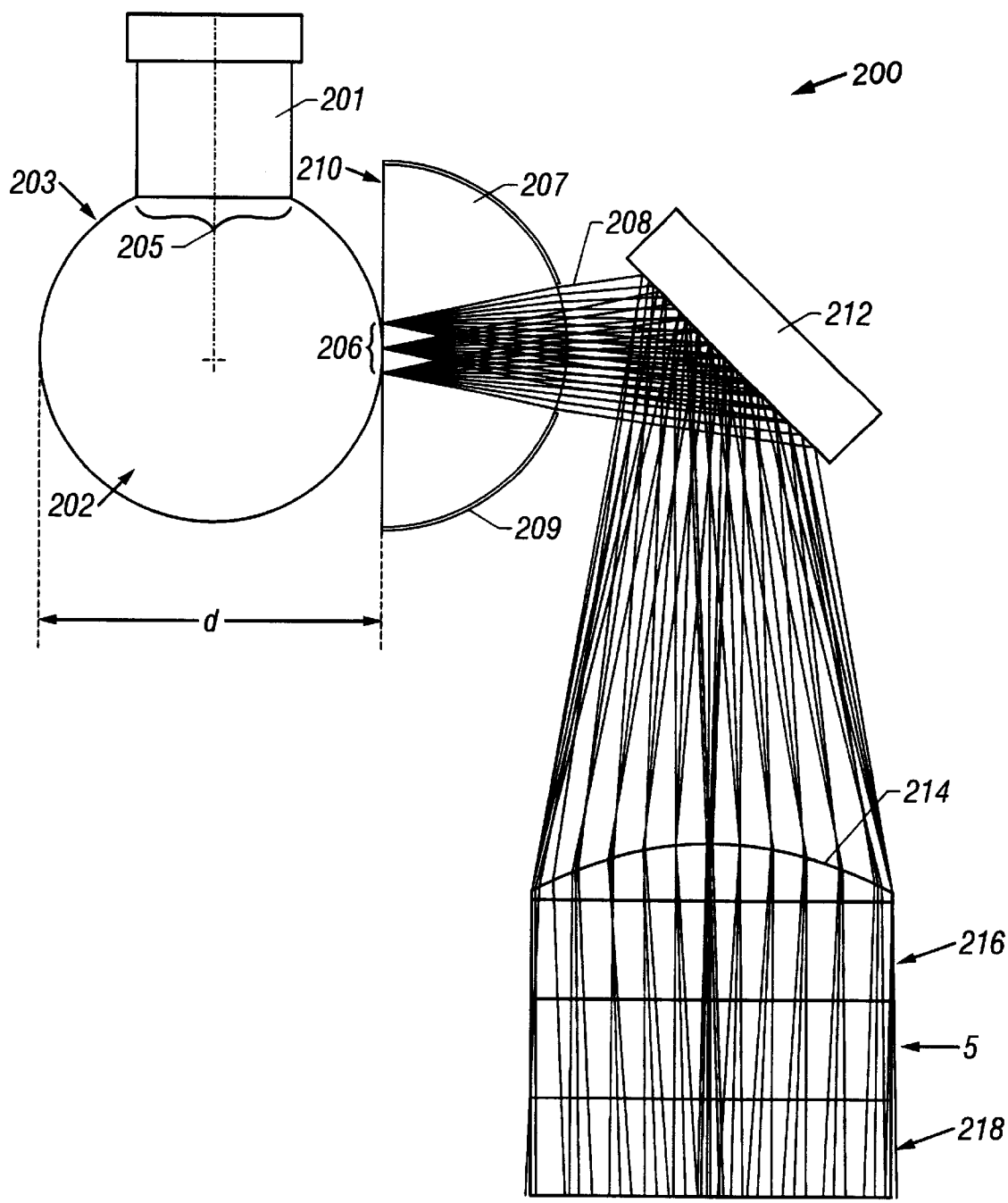
FIG. 12 is an alternate implementation of a spherical solid core integrating light mixer according to the invention.

FIG. 12 illustrates a solid core integrating assembly 200, wherein the integrating light mixer is in the form of a solid core integrator 202. A solid acrylic core integrating sphere 202 may be built into a light source means or "can" 201 which houses an LED source array of two or more LEDs and includes a window (not shown) to inject light into the solid core. The can 201 may include an electrical connector for attachment to a circuit board (not shown). An embodiment of the solid core integrating sphere 202 has a diameter "d" on the order of 7 mm, a light input port area 205 and an output area 206 having at least one output aperture. A diffuse and reflective, thin white enamel coating 203 may be applied to the outside portion of the solid core 202 exclusive of the input area 205 and output area 206.

An implementation of a light directing means 207 may be an acrylic hemisphere that may be cemented to the solid core sphere 202 at the output area 206. Although a substantially hemispheric shape is recommended for the light directing means 207, it should be understood that other shapes could be used. The light directing means 207 includes an output area 208 wherein light energy within a collecting angle may pass. The spherical surface 209 of the light directing means 207 may be aluminized except in the output area 208, while the flat surface 210 may be painted black except in the portion of the output area 206 of the solid sphere. The light directing means 207 directs light within a collecting angle from the apertures of output area 206 to a fold mirror 212 that directs the light to an aspheric collimator 214. The collimator 214 may be built into the upper platen 216 above the bill passageway 5. The hemispheric element 207 also feeds light energy outside the collecting angle of the collimator back into the integrating sphere 202, to increase the "gain" of the integrating sphere. The implementation shown recovers about 85% of the energy leaving the exit area 206. The solid core integrator assembly 200 generates a substantially homogenous light spot across the bill passageway 5, through the lower platen 218 and on to a receiver (not shown).

The core material of the solid integrating sphere 202 and the hemisphere 207 may be clear optical glass or plastic, preferably having a relatively low index of refraction. Acrylic (PMMA or polymethylmethacrylate) may be a suitable material because it is readily available in rod stock, and may be available in small spheres. A sphere or rod having a diameter in the range of 7 mm to 15 mm may be suitable for use in applications such as document validation.

The optical requirements for the core material are not extreme, since the objective is to produce a diffuse output. The material should absorb as little light as possible, and should be relatively free of striations, but its index homogeneity and surface roughness characteristics are not critical. A solid core device can be built as one piece, whereas the shell of a hollow core integrator must be made in two pieces due to the need to access the interior for coating purposes while manufacturing. Thus, a solid core integrator should have lower assembly costs.

The diffuse paint for use on the outside surface of a solid integrator consists of small scattering particles in a base having substantially the same index of refraction as the core optical material. A white acrylic enamel applied by dip coating may be suitable. A thinner scattering coating backed by an aluminum or other specular reflecting layer may also be used. An additional outside protective coating layer may be needed for protection against environmental degradation or mounting damage. For example, an external protective layer of epoxy resin enamel or other rugged material could be applied to protect the optical coating layer. A solid integrator of this type may be more rugged and compact than a hollow integrating sphere.

The core of a solid sphere has an index of refraction substantially above unity which affects the system performance characteristics in two ways. First, the entire external hemisphere couples into a small internal cone angle, due to refraction at the air/glass interface. Second, the air/glass dielectric reflectivity is a source of throughput loss. Such losses can be offset by AR coatings the input and output ports, but this solution does not work well over the large cone angles desired for maximizing the coupling of light from an LED light source to spots in the document path. Use of a low-index core material such as acrylic may be suitable.

The problem of input coupling may be solved by immersing the LED die in a plastic material having a similar index to the core material, then cementing the LED package to the core of the integrator. Such fabrication insures the maximum possible efficiency in coupling the LED output into the integrator. A cemented, high efficiency, low area coupling between LED dies and the integrator is important to obtain good performance from the integrator/illuminator.

Output coupling presents a somewhat different problem. Losses at the air/glass interface can be alleviated somewhat by AR coating, but the more significant problem is due to the fact that the output light spreads into an entire hemisphere. Thus, unless the collimating lens is the equivalent of a high numerical aperture immersion microscope lens, a significant fraction of the output light leaks past the collecting cone of the collimator.

The solid core spherical integrator 200 may have substantially the same dimensions as each of the hollow core integrators shown in the system of FIG. 6C, which include two output ports per sphere, and possibly could be used in the system shown in FIG. 6B. However, the system illustrated in FIG. 6A requires somewhat smaller integrating spheres and therefore, the solid core integrating sphere may not be suitable for such an arrangement. A fold mirror in the output collimator is required for any spherical integrator with more than one output. If only a single output is required, as in FIG. 6B, the fold mirror can be eliminated. This works best for output spots in a single row, in that it puts all LED package connectors in a single plane normal to the paper path.

Figure 13:
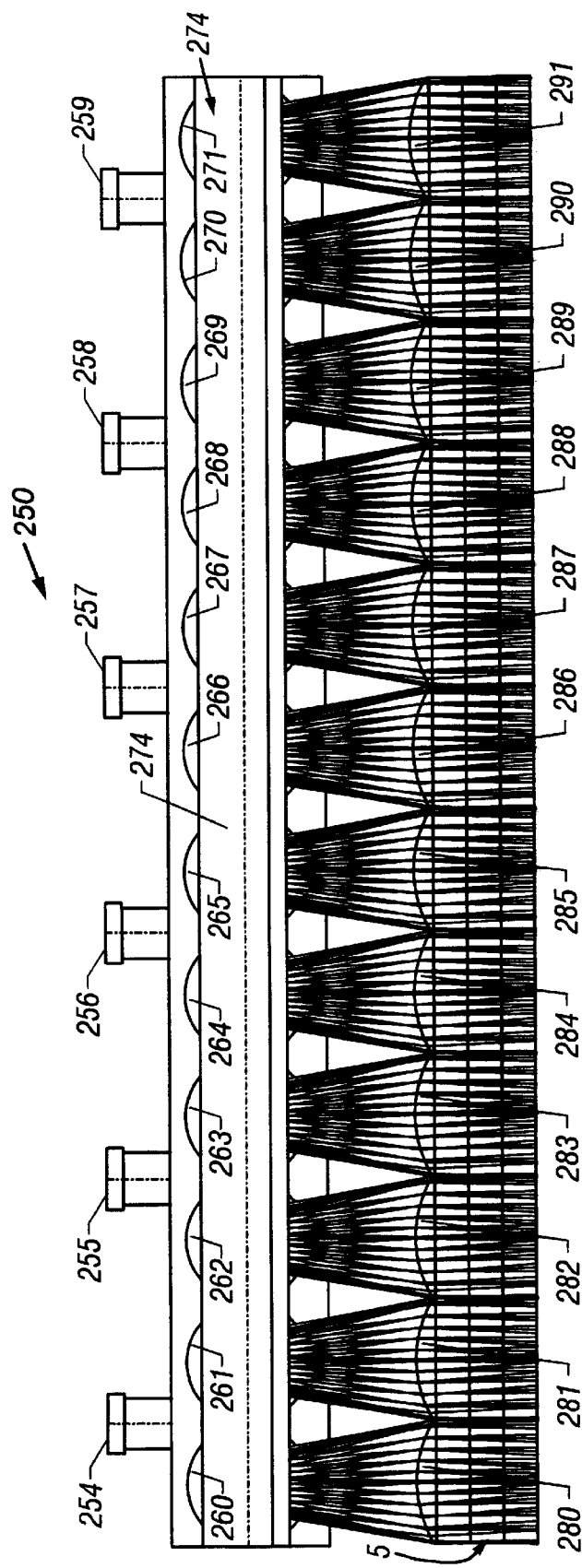
FIG. 13 is an implementation of a cylindrical solid core integrating light mixer according to the invention.

FIG. 13 shows an implementation of a cylindrical integrator system 250 that produces one row of twelve spots in the bill path 5. One cylinder 252 has six LED light source packages 254 to 259 connected thereto, and twelve hemispheric elements 260 to 271 connected thereto. Each hemispheric element has a diameter less than the spot center-to-center spacing of 7.5 mm, and all twelve hemispheres can be molded into one piece of plastic. Such a configuration can simplify manufacturing and coating processes, and simplify final assembly of the system. The diameter of the cylinder is not restricted by the output spot spacing, and may be increased, for example, to 10 mm as shown in FIG. 13. One fold mirror 274 is included so that the LED connectors can be in a plane parallel to the paper path. If the connectors can be in a plane perpendicular to the paper path, then the fold mirror can be eliminated. Also illustrated are a plurality of aspheric lenses 280 to 291 molded into an upper platen 292 above the bill path 5.

Mounting techniques similar to those discussed above could be applied to cylindrical integrators. In an implementation, one side of the cylinder could have a molded or machined flat surface, with openings in the coating where the LED packages could be cemented. (The LED package could be a linear array extending most of the length of the cylinder.) The mass of the cylinder and its attachments may be low enough to integrate into a linear connector which mounts in a linear socket on the circuit board.

A number of devices according to the invention have been described above. Nevertheless, one skilled in the art could easily make various modifications without departing from the spirit and scope of the invention. Accordingly, other implementations are within the scope of the following claims.

What is claimed is:

1. A document validation subsystem, comprising:
   a light mixer for generating at least one substantially homogenous light spot, the light mixer comprising
   a light mixing chamber,
   at least one input port associated with the mixing chamber to accommodate at least one light source,
   at least one output associated with the mixing chamber, and
   at least one collimator including at least one reflecting surface, the collimator connected to the output; and
   at least one light receiver.

2. The apparatus of claim 1, wherein the light mixing chamber includes a diffuse reflective liner applied to an interior surface.

3. The apparatus of claim 1, wherein the reflecting surface is a mirror.

4. The apparatus of claim 1, wherein the input port houses a plurality of LED light sources.

5. The apparatus of claim 4, wherein at least two light sources are of different wavelengths.

6. The apparatus of claim 4, wherein the light sources are of the same wavelength.

7. The apparatus of claim 4, wherein the LED light sources are operable to turn ON sequentially.

8. The apparatus of claim 4, wherein the LED light sources are operable to turn ON simultaneously.

9. The apparatus of claim 1, wherein a plurality of output apertures are associated with the mixing chamber, and a plurality of collimators are connected to the output apertures to generate a plurality of substantially homogenous light spots.

10. The apparatus of claim 1, wherein at least one collimator includes at least one lens.

11. The apparatus of claim 1, further comprising at least one lens component attached to an upper platen of a document passageway.

12. A method for constructing a document validation subsystem, comprising:
   constructing a light mixer for generating at least one substantially homogenous light spot;
   connecting a light source to the light mixer;
   connecting the light mixer and source to a wall of a document passageway; and
   connecting a light receiver to a wall of the document passageway to receive a light signal resulting from the substantially homogenous spot.

13. The method of claim 12, wherein the light mixer is constructed by:
   molding a chamber having at least one input port and at least one output aperture;
   applying a diffuse reflecting coating to an interior surface of the chamber; and
   connecting at least one collimator to at least one output aperture.

14. The method of claim 13, wherein the chamber is cast in two hemispheres.

15. The method of claim 13, further comprising attaching a mirror to at least one collimator for directing light.

16. The method of claim 13, further comprising attaching a lens to at least one collimator.

17. The method of claim 12, wherein the light mixer is constructed by:
   molding a light mixing chamber using an optical plastics material, wherein the chamber includes at least one input port and at least one output aperture; and
   connecting at least one collimator to at least one output aperture.

18. The method of claim 17, further comprising attaching a lens to the collimator.

19. A modular light mixer assembly for use with a document validator, comprising:
   a plurality of light mixers, each having at least one input port, at least one output aperture and at least one collimator connected to an aperture, the light mixers arranged to provide light spot output coverage across the width of a document passageway;
   a plurality of light sources, wherein at least one light source is connected to each input port; and
   at least one light receiver for sensing the light generated by the light spots and for generating document validation signals.

20. A light mixer assembly for use with a document validator, comprising:
   a plurality of light mixers, each having at least one input port, at least one output aperture and at least one collimator connected to an aperture, the light mixers arranged to provide light spot output coverage across the width of a document passageway;
   a plurality of light sources, wherein at least one light source is connected to each input port; and
   at least one light receiver for sensing the light spots and for generating document validation signals.

21. A document validator subassembly, comprising:
   a cylinder having a cavity and at least one input port and a slit output, wherein a reflective and diffusive coating is applied to the cavity and at least one collimator having a reflection surface is aligned with the slit output;
   at least one light source connected to the input port; and
   at least one light receiver.

22. A document validator subassembly, comprising:
   a cylinder having a cavity and at least one input port and a plurality of output apertures for generating a plurality of substantially homogenous light spots, wherein a reflective and diffusive coating is applied to the cavity, and a plurality of collimators is attached to the output apertures;
   at least one light source connected to the input port; and
   at least one light receiver.

23. The subassembly of claim 22, further comprising at least one light pipe connected at a first end to an output aperture and at a second end to a collimator.

24. A document validator subassembly, comprising:
   a block of optical material having a cavity that includes an internally reflecting and diffuse surface, at least one input port and at least one output aperture;
   at least one collimator having at least one reflecting surface, the collimator attached to the output aperture for generating at least one substantially homogenous output spot;
   at least one light source connected to the input port; and
   at least one receiver.

25. A method for constructing a document validator subassembly, comprising:
   connecting a light mixer to a wall of a document passageway, the light mixer capable of generating at least one substantially homogenous light spot, the light mixer formed by:
      cutting a cavity into a block of optical material, the cavity having reflective and diffuse characteristics;
      forming at least one input port and at least one output aperture that connect to the cavity;
      connecting at least one light source to each input port; and connecting at least one collimator to an output aperture; and
   connecting at least one light receiver to a wall of the document passageway to receive light resulting from the substantially homogenous light spot.

26. A document validator subassembly, comprising:
   a light mixer for generating at least one substantially homogenous light spot, the light mixer including a solid core light mixing chamber having an outside coating with diffuse and reflective characteristics, wherein the coating includes at least one input area for accommodating at least one light source, and the coating includes at least one output area, and at least one light directing means including a reflection surface for feeding light energy back into the mixing chamber, the directing means connected to the output area; and a light receiver.

27. The apparatus of claim 26, wherein the light directing means includes an output area for directing light.

28. The apparatus of claim 27, wherein the light directing means is substantially hemispherically shaped.

29. The apparatus of claim 26, further comprising at least one light source means connected to the input area.

30. The apparatus of claim 26, further comprising a flat mirror for redirecting light from the light direction means.

31. The apparatus of claim 26, further comprising a collimating lens connected to a platen of a document passageway.

32. The apparatus of claim 26, wherein the light mixing chamber is spherical.

33. The apparatus of claim 26, wherein the light mixing chamber is cylindrical.

34. The apparatus of claim 33, further comprising a linear array light source connected to the mixing chamber.

35. A method for constructing a document validator subassembly for generating at least one substantially homogenous light spot, comprising:

forming a solid core light mixer by forming a light mixing chamber of optical material, coating the chamber with a material having reflective and diffuse characteristics, forming at least one input area and at least one output area, and connecting a light directing means to each output area that directs light energy within a collecting angle to a document passageway, and reflects light energy outside the collecting angle back into the mixing chamber;

connecting the solid core light mixer to a wall of a document passageway; and connecting a light receiver to a wall of the document passageway.

36. The method of claim 35, further comprising applying an external protective layer to the coating material.

37. The method of claim 35, further comprising connecting at least one light source to each input area.

38. The method of claim 35, wherein the light directing means directs light within a collecting angle to a document passageway, and reflects light energy outside the collecting angle back into the mixing chamber.

39. The method of claim 35, wherein the light mixing chamber is formed in a spherical shape.

40. The method of claim 35, wherein the light mixing chamber is formed in a cylindrical shape.

* * * * *